(12) United States Patent
Yoshida

(10) Patent No.: US 10,273,097 B2
(45) Date of Patent: Apr. 30, 2019

(54) SHEET SUPPORTING APPARATUS AND IMAGE FORMING APPARATUS

(71) Applicant: CANON KABUSHIKI KAISHA, Tokyo (JP)

(72) Inventor: Masatoshi Yoshida, Susono (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/880,718

(22) Filed: Jan. 26, 2018

(65) Prior Publication Data

US 2018/0222698 A1 Aug. 9, 2018

(51) Int. Cl.
| | |
|---|---|
| B65H 1/14 | (2006.01) |
| B65H 1/26 | (2006.01) |
| B65H 1/08 | (2006.01) |
| B65H 1/04 | (2006.01) |
| H04N 1/00 | (2006.01) |

(52) U.S. Cl.
CPC .............. B65H 1/08 (2013.01); B65H 1/04 (2013.01); B65H 1/14 (2013.01); B65H 1/266 (2013.01); *B65H 2405/1112* (2013.01); *B65H 2405/11162* (2013.01); *B65H 2511/12* (2013.01); *B65H 2511/22* (2013.01); *B65H 2551/29* (2013.01); *H04N 1/0062* (2013.01); *H04N 1/00628* (2013.01)

(58) Field of Classification Search
CPC . B65H 1/14; B65H 1/266; B65H 1/04; B65H 2405/14; B65H 2405/141
See application file for complete search history.

(56) References Cited

U.S. PATENT DOCUMENTS

| | | | | |
|---|---|---|---|---|
| 7,971,868 | B2 * | 7/2011 | Matsushima | B65H 1/14 271/117 |
| 9,611,110 | B2 * | 4/2017 | Nishioka | B65H 1/266 |
| 2014/0367908 | A1 * | 12/2014 | Sawada | B65H 1/12 271/160 |
| 2016/0289017 | A1 | 10/2016 | Yoshida et al. | |
| 2017/0217698 | A1 | 8/2017 | Yoshida et al. | |
| 2018/0143576 | A1 * | 5/2018 | Nishioka | G03G 15/6508 |

FOREIGN PATENT DOCUMENTS

| | | | |
|---|---|---|---|
| JP | 2003246472 A | * | 9/2003 |
| JP | 2006137500 A | * | 6/2006 |
| JP | 2011063365 A | * | 3/2011 |
| JP | 2015-074504 A | | 4/2015 |

* cited by examiner

*Primary Examiner* — Luis A Gonzalez
(74) *Attorney, Agent, or Firm* — Venable LLP

(57) ABSTRACT

A sheet supporting apparatus includes a sheet supporting portion supported liftably between a standby position and a lifted position, a lifting portion arranged below the sheet supporting portion, and configured to lift the sheet supporting portion toward the lifted position by pressing the sheet supporting portion from below. The sheet supporting portion includes a supporting surface defining a non-interference region in which a width regulating portion can move in a width direction. A projected portion is provided on the lifting portion, and configured to project upward toward a non-interference region.

12 Claims, 8 Drawing Sheets

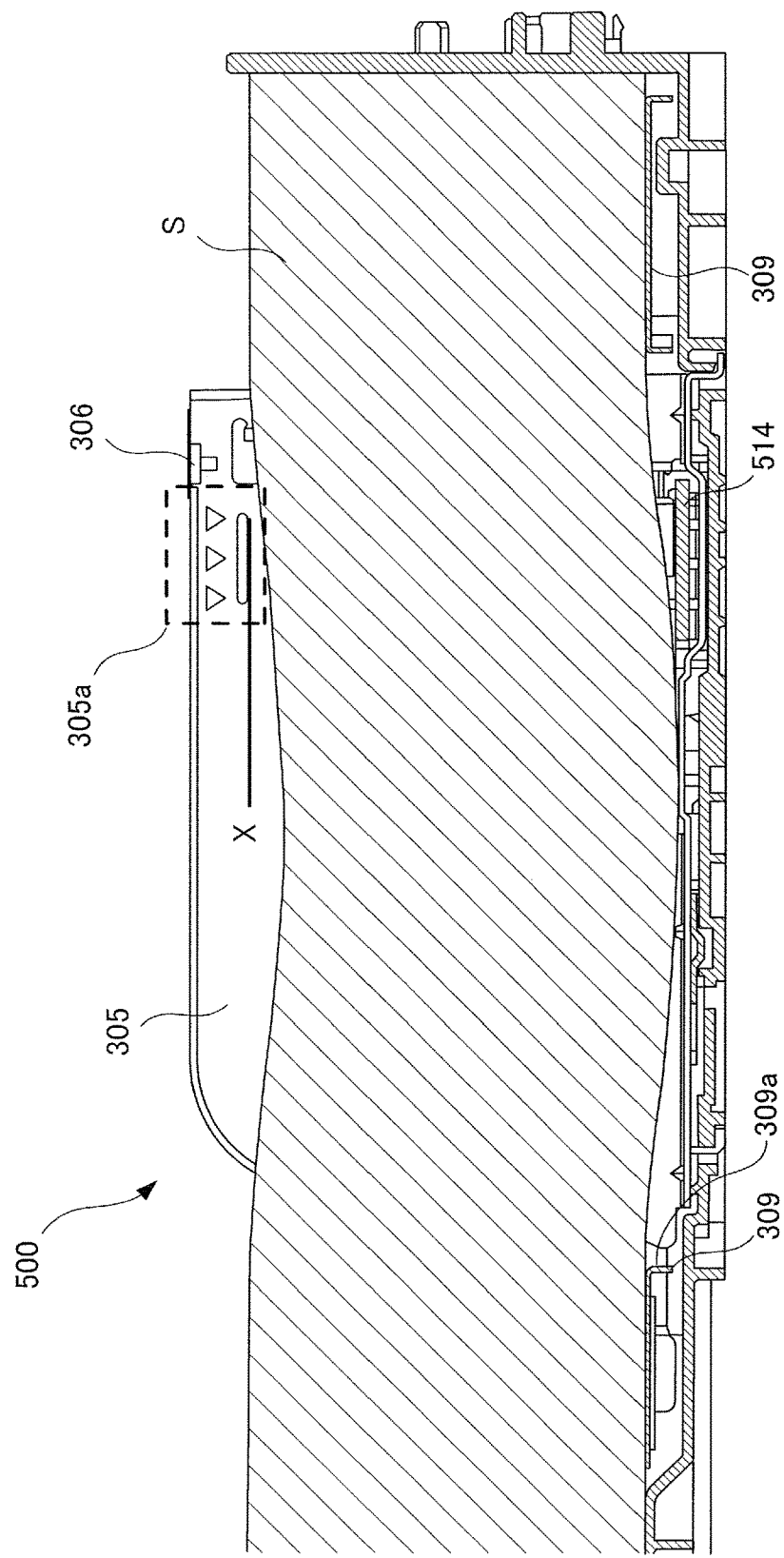

SHEET SUPPORTING APPARATUS AND IMAGE FORMING APPARATUS

BACKGROUND OF THE INVENTION

Field of the Invention

The present invention relates to a sheet supporting apparatus for supporting a sheet, and an image forming apparatus equipped with the sheet supporting apparatus.

Description of the Related Art

Hitherto, as disclosed in Japanese Unexamined Patent Application Publication No. 2015-74504, an image forming apparatus equipped with a storage cassette including a tray for supporting a sheet and a pair of side regulation members for regulating a width direction position of the sheet supported on the tray is known. The tray has a width direction length corresponding to a dimension of a maximum supportable size of the sheet on the tray, and a cutout is formed on the tray such that an end portion of the sheet having a minimum supportable size can be regulated by the side regulation member.

The side regulation member includes a loading limit index that indicates an upper limit of the sheets capable of being supported on the tray, and an auxiliary supporting portion provided immediately under the loading limit index and configured to support the sheets. The auxiliary supporting portion is formed to have approximately the same height as an upper face of the tray, and an end portion in the width direction of the sheet supported on the tray is supported from below by the auxiliary supporting portion. Thereby, the sheets can be suppressed from being sagged down into the cutout formed on the tray, and the sheets can be prevented from being loaded beyond the loading limit index.

However, the auxiliary supporting portion disclosed in Japanese Unexamined Patent Application Publication No. 2015-74504 merely extends slightly in the width direction, and for example, if a sheet having a large width-direction size is supported on the tray, the sheet may still be sagged down into the cutout even if the sheet is supported by the tray and the auxiliary supporting portion. In that case, a gap is formed between the loading limit index and the uppermost surface of the sheets, and the sheets may be overloaded, according to which sheet feeding failure such as folding or jamming of the sheet may occur.

Further, if the auxiliary supporting portion is configured to be extended greatly in the width direction, it becomes necessary to form a cutout independently on the tray so that the tray does not interfere with the auxiliary supporting portion, and the strength of the tray is weakened thereby. If the strength of the tray is weakened, the sheets cannot be stably positioned at the sheet feed position especially in a state where the tray supporting a full load of sheets is lifted, and sheet feeding failure may occur.

SUMMARY OF THE INVENTION

According to a first aspect of the present invention, a sheet supporting apparatus includes a storage portion configured to store a sheet, a width regulating portion supported movably in a width direction orthogonal to a sheet conveyance direction on the storage portion, and configured to regulate a position of an end portion in the width direction of the sheet stored in the storage portion, a sheet supporting portion supported liftably between a standby position and a lifted position on the storage portion and configured to support the sheet, the sheet supporting portion including a supporting surface defining a non-interference region in which the width regulating portion is configured to move in the width direction, a lifting portion arranged below the sheet supporting portion, and configured to lift the sheet supporting portion toward the lifted position by pressing the sheet supporting portion from below, and a projected portion provided on the lifting portion, and configured to project upward toward the non-interference region.

According to a second aspect of the present invention, a sheet supporting apparatus includes a storage portion configured to store a sheet, a width regulating portion supported movably in a width direction orthogonal to a sheet conveyance direction on the storage portion, and configured to regulate a position of an end portion in the width direction of the sheet stored in the storage portion, a sheet supporting portion supported liftably between a standby position and a lifted position on the storage portion and configured to support the sheet, a lifting portion arranged below the sheet supporting portion, and configured to lift the sheet supporting portion toward the lifted position by pressing the sheet supporting portion from below, and a projected portion provided on the lifting portion, and configured to project upward at a position where the projected portion does not interfere with the sheet supporting portion and support the sheet with the sheet supporting portion.

Further features of the present invention will become apparent from the following description of exemplary embodiments with reference to the attached drawings.

BRIEF DESCRIPTION OF THE DRAWINGS

FIG. 8 is a cross-sectional view illustrating a cassette according to a comparative example.

DESCRIPTION OF THE EMBODIMENTS

First Embodiment
Entire Configuration

Figure 1:
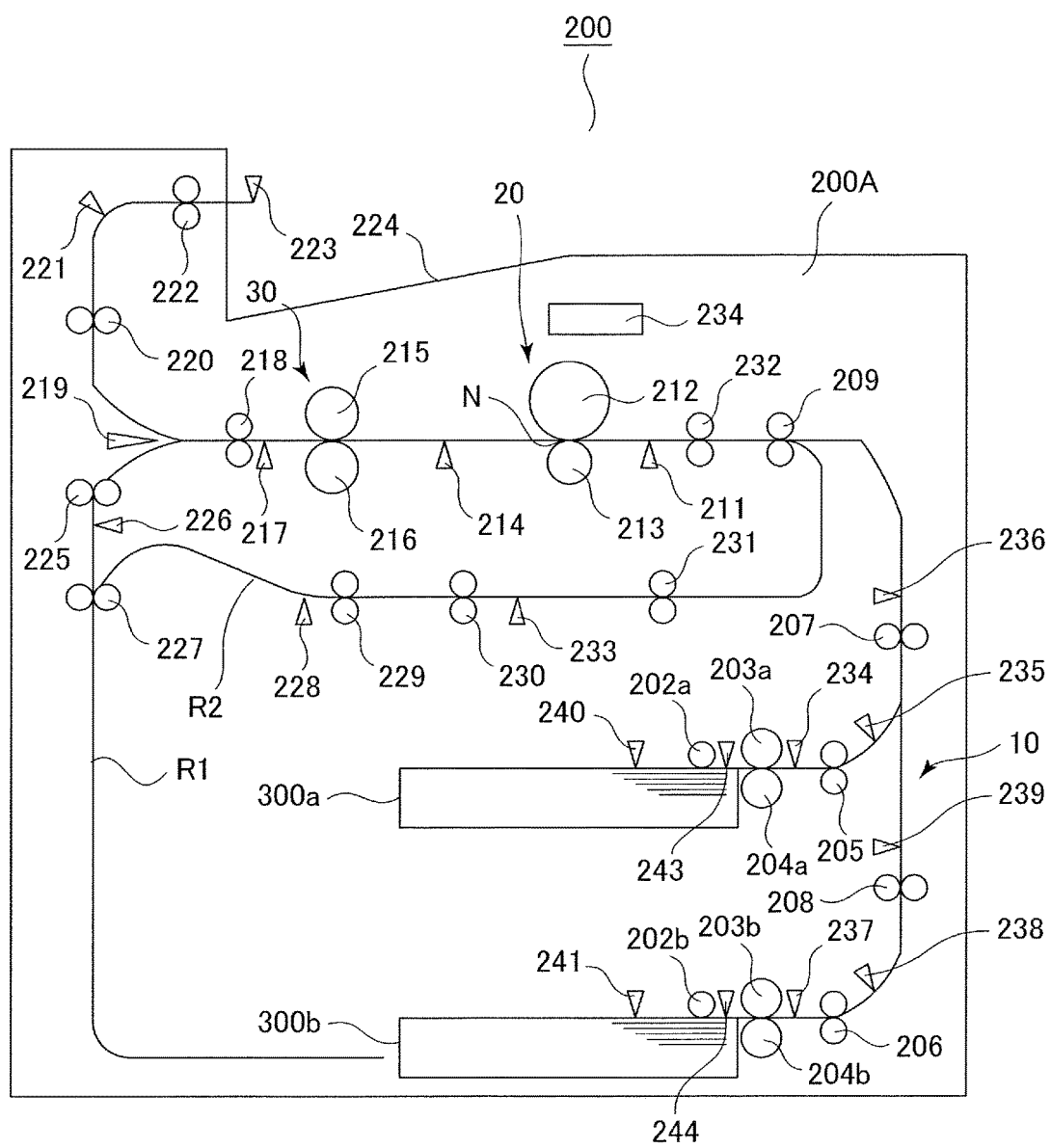
FIG. 1 is an entire schematic diagram illustrating a printer according to a first embodiment.

First, a first embodiment of the present invention will be described. A printer 200 serving as an image forming apparatus is a laser beam printer of an electrophotographic system configured to form a monochrome toner image. The printer 200 includes, as illustrated in FIG. 1, a sheet feeding unit 10 configured to feed a supported sheet, and an image forming unit 20 configured to form an image on a sheet fed from the sheet feeding unit 10. Further, the printer 200 includes a fixing unit 30 configured to fix an image transferred to the sheet, and a sheet discharge roller pair 222 configured to discharge the sheet onto a sheet discharge tray 224.

If a command to form an image is output to the printer 200, an image forming process by the image forming unit 20 is started based on image information entered from an external computer or the like connected to the printer 200. The image forming unit 20 includes a photosensitive drum 212, a laser scanner 234, a transfer roller 213, and a charging unit and a developing unit which are not shown. The laser scanner 234 irradiates laser beams toward the photosensitive drum 212 based on entered image information. At this time, the photosensitive drum 212 is charged in advance by the charging unit not shown, and an electrostatic latent image is formed on the photosensitive drum 212 by irradiation of laser beams. Thereafter, the electrostatic latent image is developed by the developing unit, and a monochrome toner image is formed on the photosensitive drum 212.

Simultaneously as the above-described image forming process, a sheet is fed from the sheet feeding unit 10. The sheet feeding unit 10 includes cassettes 300*a* and 300*b* detachably attached to a printer body 200A, the sheet presence sensors 240 and 241 configured to detect sheets in the cassettes 300*a* and 300*b*, and sheet surface detection sensors 243 and 244 configured to detect an upper face of the sheet.

The sheet stored in the cassette 300*a* is fed by a pickup roller 202*a*, and separated one sheet at a time by a feed roller 203*a* and a retard roller 204*a*. The sheet fed from the cassette 300*a* is conveyed by a drawing roller pair 205 and conveyance roller pairs 207 and 209 to a registration roller pair 232. Similarly, the sheet stored in the cassette 300*b* is fed by a pickup roller 202*b*, and separated one sheet at a time by a feed roller 203*b* and a retard roller 204*b*. Then, the sheet fed from the cassette 300*b* is conveyed by a drawing roller pair 206 and conveyance roller pairs 208, 207 and 209 to the registration roller pair 232.

Skewing of the sheet conveyed from the sheet feeding unit 10 is corrected by a leading end of the sheet being aligned at the nip of the registration roller pair 232 in a stopped state. Furthermore, skewing of the sheet can also be corrected by having the leading end of the sheet abut against a registration shutter not shown, instead of the nip of the registration roller pair 232.

The sheet subjected to skew feed correction is conveyed at a predetermined timing by the registration roller pair 232, and the toner image on the photosensitive drum 212 is transferred to a first side, i.e., front side, of the sheet by an electrostatic load bias applied to the transfer roller 213. A predetermined heat and pressure is applied from a heating roller 215 and a pressure roller 216 of the fixing unit 30 to the sheet to which the toner image has been transferred, and the toner is melted and fixed.

In a state where the sheet is nipped by the fixing unit 30 and a transfer nip N formed by the photosensitive drum 212 and the transfer roller 213, the apparatus is controlled such that a conveyance speed of the sheet by the fixing unit 30 is slower than a conveyance speed of the sheet at the transfer nip N. Thereby, the sheet subjected to the fixing process is sagged suitably, and toner can be prevented from falling from the sheet and causing image defects. The sheet having passed the fixing unit 30 is conveyed by conveyance roller pairs 218 and 220 to the sheet discharge roller pair 222, and discharged by the sheet discharge roller pair 222 onto the sheet discharge tray 224.

If images are to be formed on both sides of the sheet, a guide member 219 is pivoted upward, and conveyed by a conveyance roller pair 225 to a reverse conveyance path R1. The sheet conveyed to the reverse conveyance path R1 is subjected to switch-back by a reverse conveyance roller pair 227, and conveyed to a duplex conveyance path R2. The sheet conveyed to the duplex conveyance path R2 is conveyed by a plurality of conveyance roller pairs 229, 230, 231 and 209 to the registration roller pair 232 again.

Then, an image is formed to a second side, i.e., rear side, of the sheet in a similar manner as the first side by the image forming unit 20, and the sheet is discharged onto the sheet discharge tray 224. An upper limit amount of the sheet discharged onto the sheet discharge tray 224 is detected by a sheet discharge full-load sensor 223, and the position of the sheet conveyed inside the printer 200 is detected by a plurality of sensors 211, 214, 217, 219, 221, 226, 228, and 233 through 239.

Cassette

Figure 2:
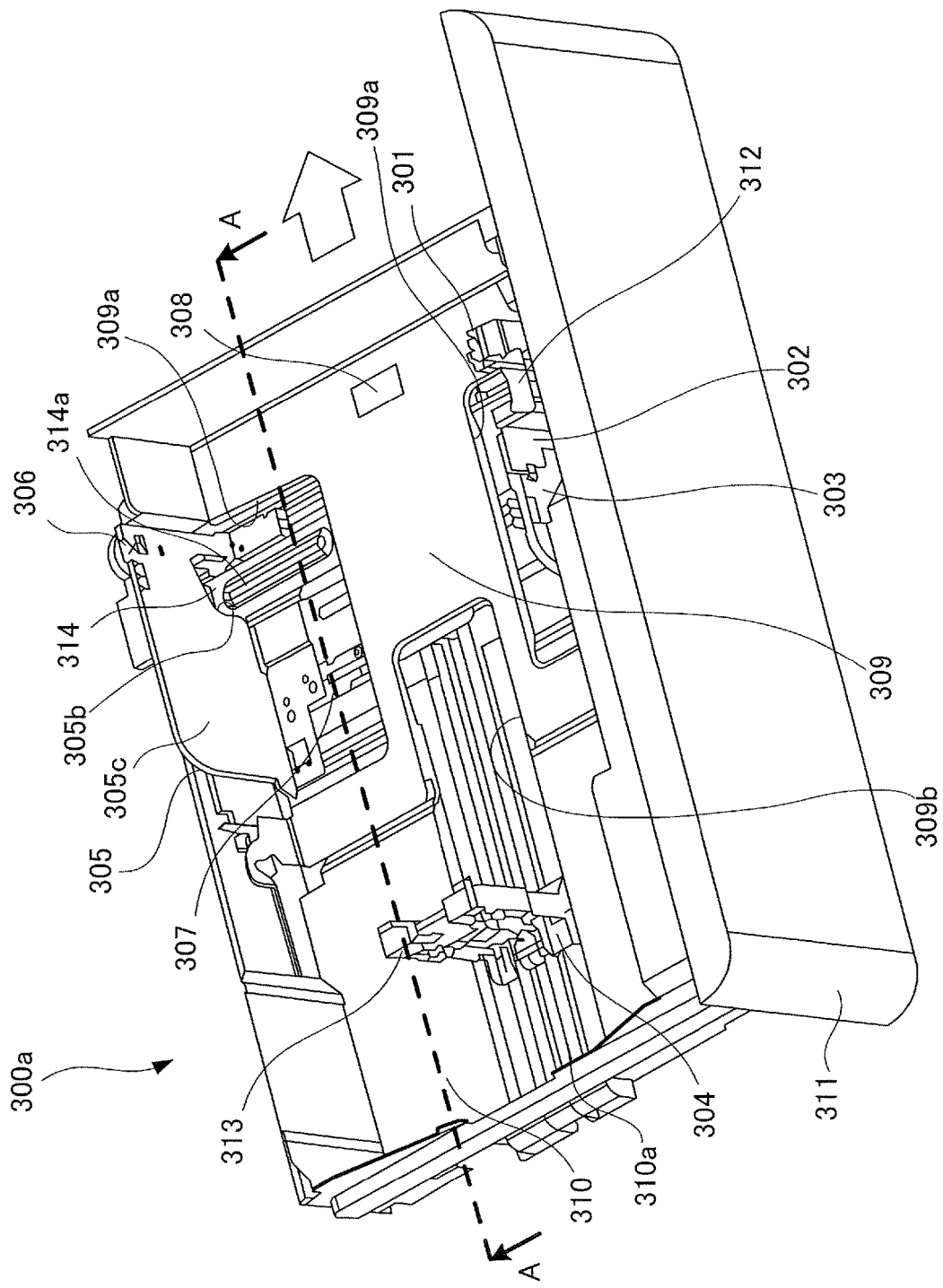
FIG. 2 is a perspective view illustrating a cassette.

Next, the cassette 300*a* will be described in detail, and since the cassette 300*b* adopts a similar configuration as the cassette 300*a*, cassette 300*b* will not be described. As illustrated in FIG. 2, the cassette 300*a* includes a cassette body 310, and a cassette cover 311 attached upstream in a direction of attachment of the cassette body 310. The cassette body 310 serving as a storage, i.e., storage portion, stores sheets, and the cassette body 310 supports a sheet supporting portion 309 configured to support sheets, a lifter 314 serving as a lifting portion, side regulating plates 303 and 305, and a trailing end regulating plate 304. The sheet supporting portion 309 is formed, for example, by molding synthetic resin or bending sheet metal, and the lifter 314 is formed, for example, by bending sheet metal.

The trailing end regulating plate 304 is supported movably along a rail 310*a* formed on the cassette body 310, and contacts a trailing edge, that is, upstream end in the sheet conveyance direction, of the sheet supported on the sheet supporting portion 309, and regulates the position thereof. A holder member 302 is attached to the side regulating plate 303 on a front side, and on the holder member 302 are attached a pressing member 301 provided through an urging member not shown, and a lock release lever 312. Further, a height regulating portion 306 that protrudes toward a width direction from a contact surface 305*c* capable of being in contact with an end portion in a width direction of the sheet orthogonal to the sheet conveyance direction is formed to the side regulating plate 305 on a depth side, and the height regulating portion 306 regulates the sheet from being lifted.

The pressing member 301 is configured to press the sheet supported on the sheet supporting portion 309 toward the side regulating plate 305 on the depth side by the urging member arranged between the pressing member 301 and the holder member 302. Since a plane of the side regulating plate 305 on the depth side to which a side edge of the sheet contacts serves as a conveyance reference in the width direction for conveying the sheet, the sheet can be conveyed along the conveyance reference by abutting the side edge of the sheet against the side regulating plate 305 on the depth side during conveyance. The lock release lever 312 is provided on a locking member not shown capable of being engaged with or disengaged from the cassette body 310, and the locking member is provided on the holder member 302. By operating the lock release lever 312, the locking member locked to the cassette body 310 is disengaged, and the side regulating plate 303 can be moved.

A rack 307 is respectively formed to the pair of side regulating plates 303 and 305, and the racks 307 are meshed with a pinion gear not shown supported rotatably on the cassette body 310. Therefore, if the user moves the side regulating plate 303 on the front side in the width direction while operating the lock release lever 312, the side regulating plate 305 on the depth side is also moved in an interlocked manner to a direction opposite from the direction of movement of the side regulating plate 303. Thereby, both end portions of the sheet in the width direction supported by the sheet supporting portion 309 are interposed between the side regulating plates 303 and 305, and the position of the sheet in the width direction is thereby regulated.

Figure 3:
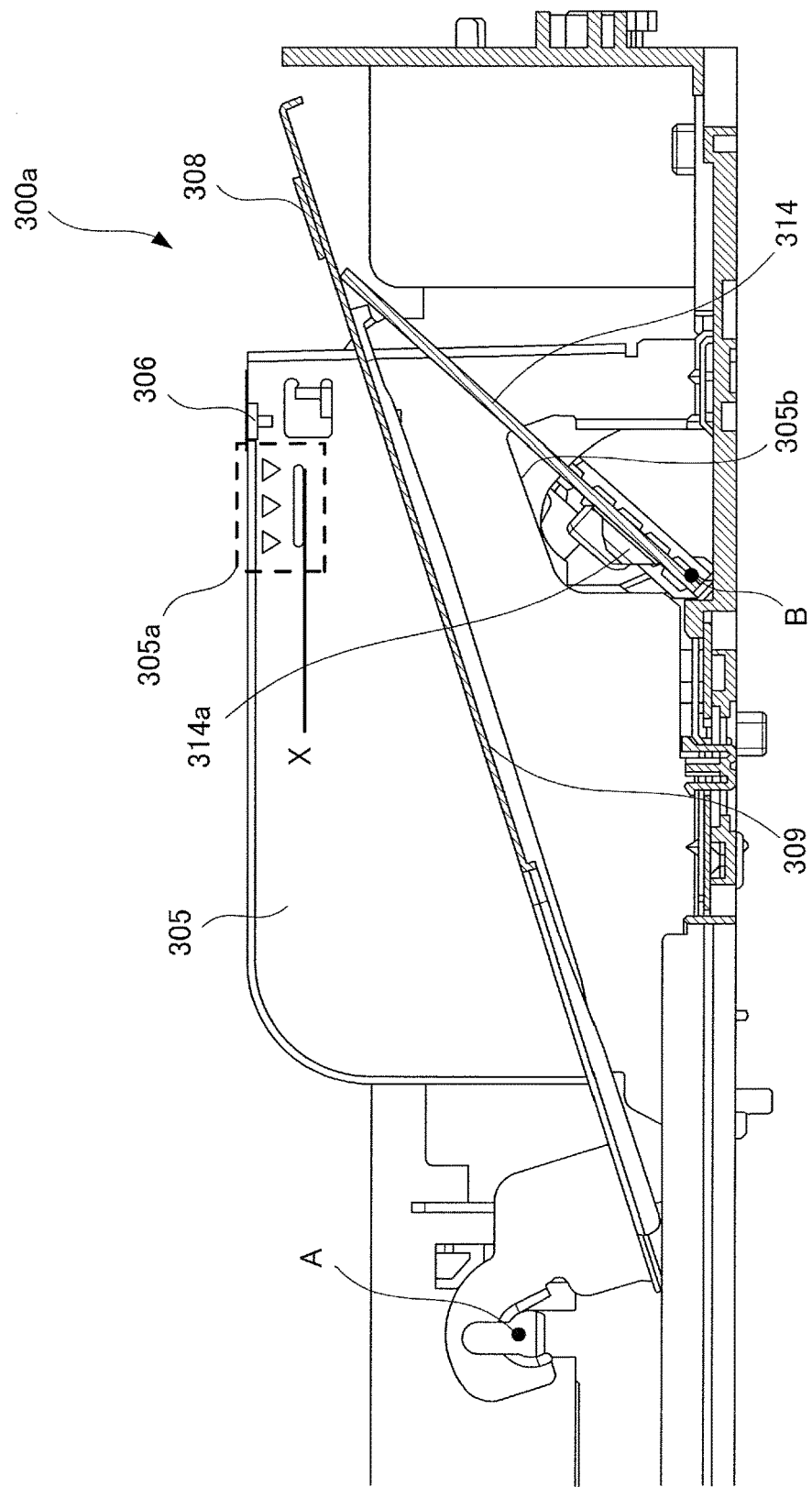
FIG. 3 is an A-A cross-section of FIG. 2 illustrating a state in which a sheet supporting portion is positioned at a lifted position.
Figure 5:
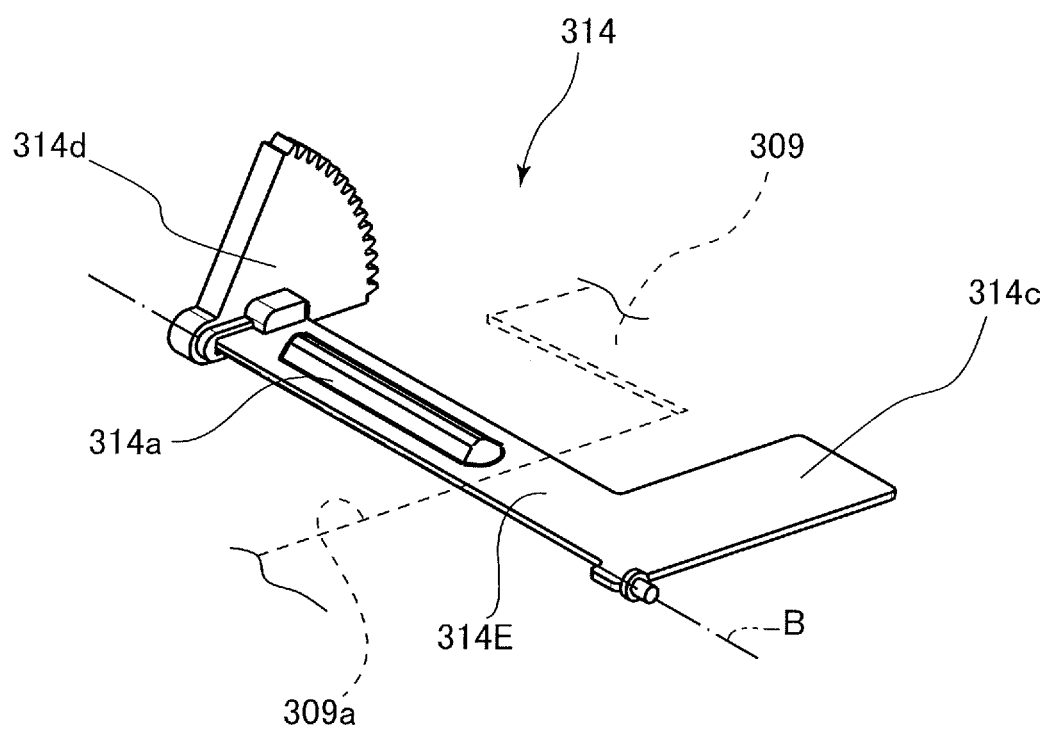
FIG. 5 is a perspective view illustrating a lifter.

As illustrated in FIG. 3, the sheet supporting portion 309 is supported pivotably on the cassette body 310 around a pivot axis A, and the lifter 314 is supported pivotably on the cassette body 310 around a pivot axis B, the lifter 314 capable of being in contact with a rear side of the sheet supporting portion 309. The sheet supporting portion 309 is configured liftably from a standby position, i.e., position illustrated in FIG. 2, where the sheet supporting portion is positioned along an upper surface of a bottom portion of the cassette body 310, to a lifted position, i.e., position illustrated in FIG. 3, where the sheet supporting portion is positioned such that a downstream side in a conveyance direction of the sheet supported on the sheet supporting portion is positioned at an upper position. As illustrated in FIG. 5, the contact portion 314c capable of being in contact with a rear side of the sheet supporting portion 309 is provided on one side of the lifter 314, and an interface gear 314d capable of being meshed with a driving gear not shown to which drive from a motor not shown is transmitted is provided on the other side of the lifter 314. The contact portion 314c and the interface gear 314d of the lifter 314 are connected by a plate-like member 314E. After the user has set sheets to the cassette 300a positioned at the standby position, if the cassette 300a is inserted to the printer body 200A, the lifter 314 pivots around the pivot axis B through the interface gear 314d attached to the lifter 314.

As illustrated in FIG. 3, in a state where the lifter 314 is lifted up with the pivot axis B serving as a fulcrum, the sheet supporting portion 309 is pushed up by the lifter 314, and pivots from the standby position to the lifted position with the pivot axis A serving as the fulcrum. The pickup roller 202a (refer to FIG. 1) capable of moving in swinging motion in the vertical direction and biased downward by a spring not shown is arranged approximately above a separation sheet 308 adhered to the sheet supporting portion 309. If an uppermost surface of the sheet supported on the sheet supporting portion 309 is detected by the sheet surface detection sensors 243 and 244 (refer to FIG. 1), a control portion not shown stops the motor, and lifting of the sheet supporting portion 309 is stopped. In a state where the sheet supporting portion 309 is stopped, the pickup roller 202a is in contact with an upper surface of the sheet on the sheet supporting portion 309 by a predetermined pressure. In a state where the pickup roller 202a rotates, the sheet is conveyed, and the sheet is further separated and conveyed one sheet at a time by the feed roller 203b and the retard roller 204b. Further, a loading limit mark 305a serving as an indication portion is provided on the side regulating plate 305 serving as a width regulating portion, and a loading limit line X indicates an upper limit height of the sheet capable of being supported on the cassette 300a. The side regulating plate 305 is formed by molding synthetic resin, and the loading limit mark 305a is integrally molded by a molding die used for molding the side regulating plate 305. Other than the above configuration, a sticker on which an index is printed can be adhered to the side regulating plate 305 as the indication portion.

The lifter 314 and a projected portion 314a described later extend in the width direction, as illustrated in FIG. 2, are arranged to be overlapped with the contact surface 305c of the side regulating plate 305 when seeing from the sheet conveyance direction, and are positioned upward from the racks 307 of the side regulating plates 303 and 305. Therefore, a through hole 305b through which the lifter 314 can pass is formed on the contact surface of the side regulating plates 303 and 305, and the through hole 305b is configured so as not to interfere with a pivoting locus of the lifter 314. Therefore, the lifter 314 does not interfere with the side regulating plates 303 and 305 in any position of the side regulating plates 303 and 305 in the width direction.

Cutouts 309a and 309a that are cut out in the width direction are formed on the sheet supporting portion 309, such that the sheet supporting portion 309 does not interfere with the side regulating plates 303 and 305 in the locus of movement of the side regulating plates 303 and 305. That is, the side regulating plates 303 and 305 can move in the width direction within the cutouts 309a and 309a. The size of the cutouts 309a and 309a is determined by the difference between a maximum size sheet and a minimum size sheet in the width direction to which the cassette 300a corresponds, and naturally, if the difference between the sizes is great, the size of the cutouts 309a and 309a in the width direction also becomes great.

A cutout 309b in the sheet conveyance direction is further formed to the sheet supporting portion 309 so that the sheet supporting portion 309 does not interfere with the trailing end regulating plate 304 along the locus of movement of the trailing end regulating plate 304, and the size of the cutout 309b is determined by the length in the conveyance direction of the minimum size sheet to which the cassette 300a corresponds. As described above, for example, if the minimum size of the sheet to which the cassette 300a corresponds is small, the size of the cutouts of the sheet supporting portion 309 in the width direction and the sheet conveyance direction will be great, and ensuring of the strength of the sheet supporting portion 309 becomes difficult.

Now, as illustrated in FIG. 8, according to a comparative example in which a lifter 514 is not provided with a projected portion 314a (refer to FIGS. 4 and 5), a case is considered in which sheets are supported on the sheet supporting portion 309 up to the loading limit line X in a state where the side regulating plates 303 and 305 are moved away from one another to correspond to a large sized sheet. In this case, a bottom side of the sheet is sagged down into a cutout 309a of the sheet supporting portion 309 by the own weight of the sheet, and a position of the uppermost surface of the supported sheets is lowered. Thereby, a gap is formed between the loading limit line X provided on the side regulating plate 305 and the uppermost surface of the supported sheets, and thus, an overloaded state may occur in which the user loads the sheets above the upper limit of the number of sheets that can be supported on the cassette 300a.

If an overloaded state occurs, a problem may arise by a portion of the printer body 200A being in contact with or interfering with the uppermost surface of the sheet and causing damage to the sheet. Further, the overloaded state may cause the sheet to bend or cause sheet feed failure. The attempt to ensure a clearance between the printer body 200A and the uppermost surface of the sheets such that the printer body 200A does not contact or interfere with the sheets results in increase of overall size of the apparatus in the height direction. Further, if the loading limit line X is lowered by predicting the amount of sagging of the lower surface of the sheet, a problem arises in that not only the maximum amount of load of large size sheets but also the maximum amount of load of small size sheets is reduced.

Figure 4:
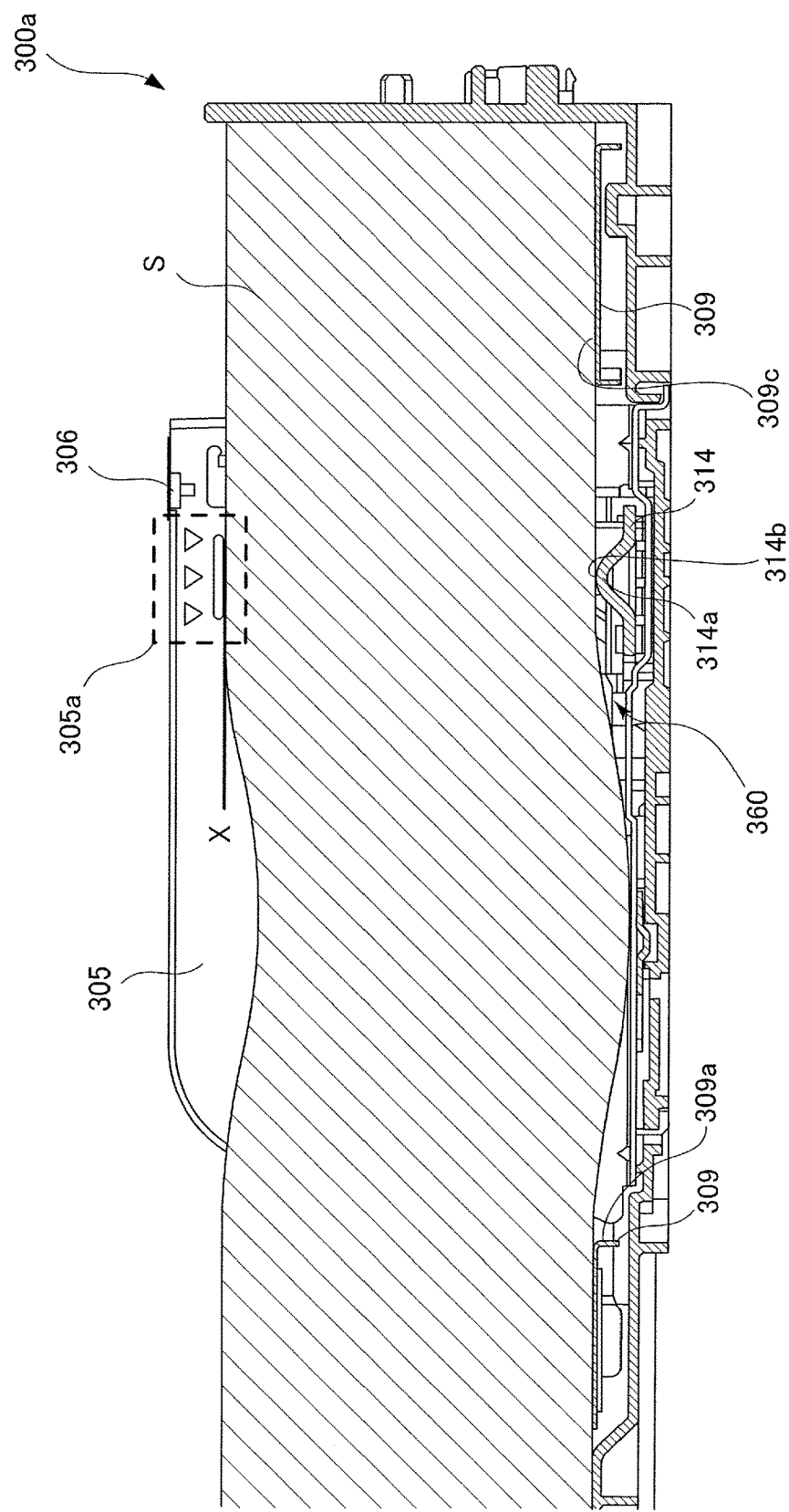
FIG. 4 is an A-A cross-sectional view of FIG. 2 illustrating a state in which the sheet supporting portion is positioned at a standby position.

Therefore, according to the present embodiment, as illustrated in FIG. 4, a projected portion 314a that protrudes upward toward an area 360 serving as a non-interference region surrounded by the cutouts 309a on the sheet supporting portion 309 is formed integrally to a plate-like member 314E of the lifter 314. That is, the area 360 is an area corresponding to the cutout 309a formed on a supporting surface 309c of the sheet supporting portion 309. The projected portion 314a is formed integrally to the lifter 314 formed of sheet metal through drawing, for example. In a state where the sheet supporting portion 309 is positioned at the standby position, the projected portion 314a is formed such that an upper surface 314b is set at approximately the same height as a supporting surface 309c configured to support the sheets on the sheet supporting portion 309. Thereby, even if sheets are supported to reach the loading limit line X on the sheet supporting portion 309 in a state where the side regulating plates 303 and 305 moved away from one another to correspond to the large sized sheet, the sheets can be supported on the projected portion 314a, and sagging down of the lower side of the sheet can be reduced. In other words, the projected portion 314a is provided on the lifting portion 314, and configured to project upward at a position where the projected portion 314a does not interfere with the sheet supporting portion 309 and support the sheet with the sheet supporting portion 309. Further, the projected portion 314a is extended in the width direction within the range of the cutout 309a, such that the sheets supported on the sheet supporting portion 309 can be supported stably.

Since the loading limit mark 305a is arranged directly above the projected portion 314a, it becomes possible to accurately determine whether the sheet is in an overloaded state or not in a state where the sheets supported on the sheet supporting portion 309 are not sagged down. Thus, it becomes possible to approximately eliminate the gap between the loading limit line X and the uppermost surface of the sheets in a state where sheets are stacked to the loading limit line X in the cassette 300a, and therefore, it becomes possible to prevent the user from stacking the sheets in an overloaded state.

In place of the projected portion 314a, it may be possible to extend a part of the sheet supporting portion 309 in the width direction approximately immediately below the loading limit mark 305a to prevent overloading of the sheets, but this configuration has the following drawback. With reference to FIG. 3, since a part of the sheet supporting portion 309 is extended in the width direction, in consideration of a case where the sheet supporting portion 309 is pivoted to the lifted position, the size of the through hole 305b formed on the side regulating plate 305 is increased compared to the present embodiment. That is, since the sheet supporting portion 309 is positioned upward from a maximum height of the lifter 314 at the area below the loading limit mark 305a, the size of the through hole 305b must be increased.

If the stiffness of the side regulating plate 305 is deteriorated since the through hole 305b is increased in size, when the user inserts a sheet bundle to the cassette 300a, the side regulating plate may be bent by the impact. Especially if the side regulating plate 305 is positioned at the printing reference side, a problem may arise where precision of printing may be deteriorated. As described, the present embodiment can reduce the size of the through hole 305b compared to a case where a portion of the sheet supporting portion 309 is extended in the width direction, and stiffness of the side regulating plate 305 can be ensured.

As described, according to the present embodiment, the projected portion 314a is formed on the lifter 314, such that sagging of the sheets supported on the sheet supporting portion 309 can be reduced by the projected portion 314a. Thus, the user can refer to the loading limit line X of the loading limit mark 305a provided immediately above the projected portion 314a, and prevent overload of the sheets regardless of the sheet size. Further, since the configurations of the sheet supporting portion 309 and the side regulating plates 303 and 305 are not changed from the conventional configurations, and the stiffness of the components is not deteriorated by providing the projected portion 314a to the lifter 314, sheets can be loaded stably, and feeding failure or print failure can be prevented.

Second Embodiment

Next, a second embodiment according to the present invention will be described. The second embodiment adopts a configuration in which the projected portion 314a according to the first embodiment is formed as a separate member as the lifter 314. Therefore, configurations that are similar to the first embodiment are either not shown in the drawing or assigned with the same reference numbers.

Figure 6:
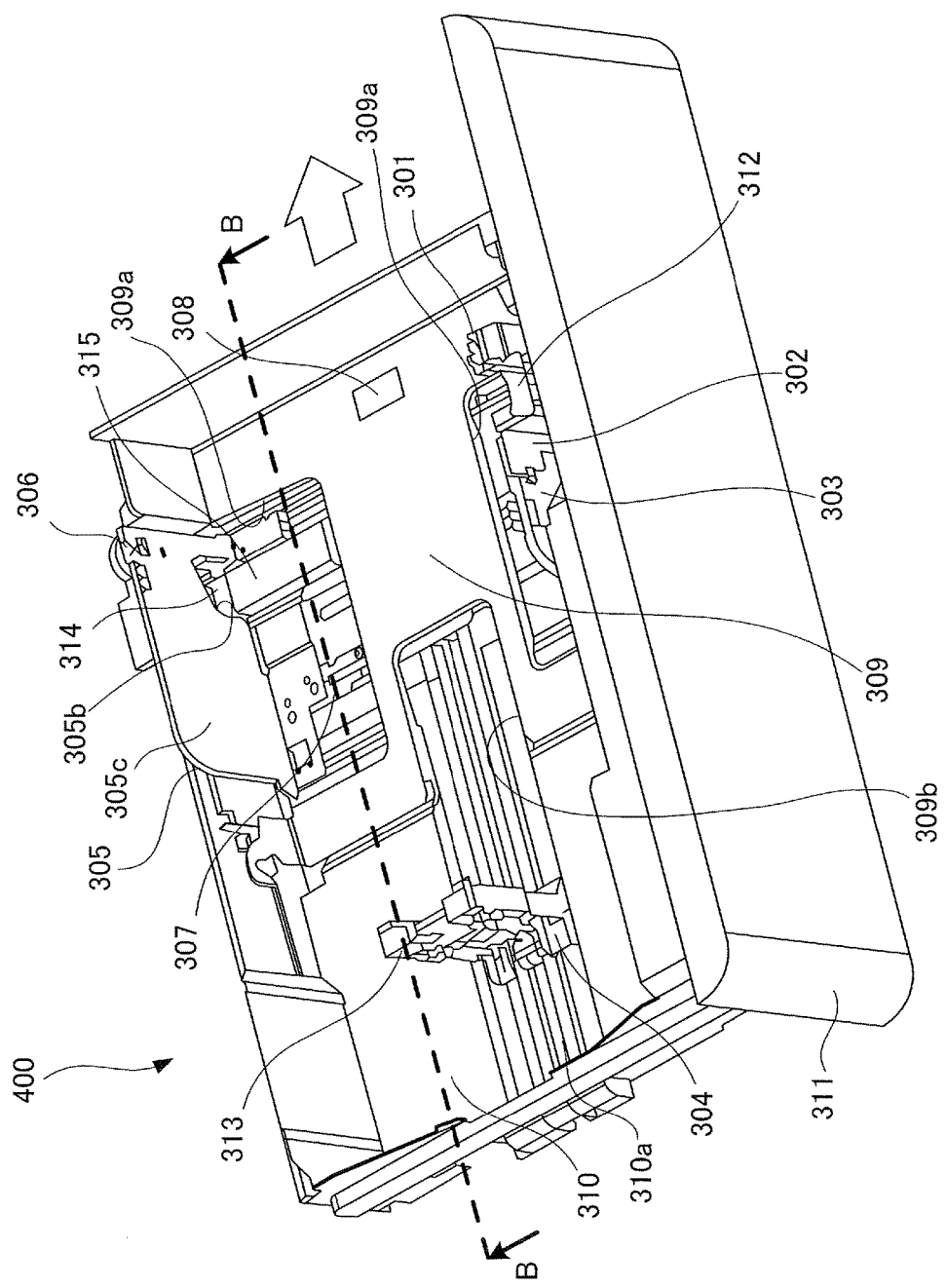
FIG. 6 is a perspective view illustrating a cassette according to a second embodiment.
Figure 7:
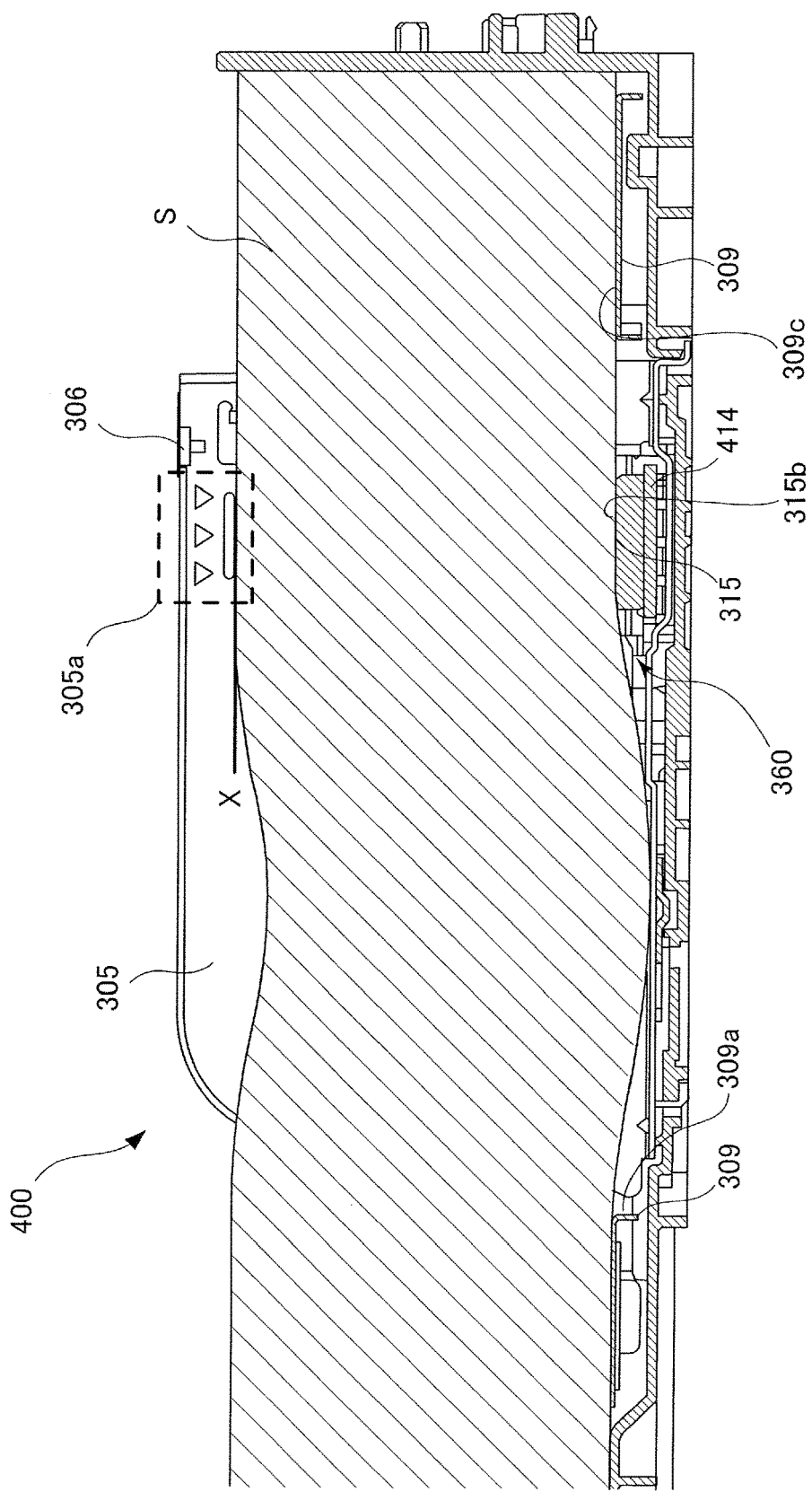
FIG. 7 is a B-B cross-sectional view of FIG. 6 illustrating a state in which the sheet supporting portion is positioned at a standby position.

As illustrated in FIGS. 6 and 7, a cassette 400 according to the present embodiment includes a lifter 314 configured to lift a sheet supporting portion 309, and a height aligning member 315 serving as a projected portion that is formed as a separate member as the lifter 314 is fixed to an upper surface of the lifter 314. The height aligning member 315 is arranged in an area 360 surrounded by a cutout 309a on the sheet supporting portion 309. In a state where the sheet supporting portion 309 is positioned at a standby position, an upper surface 315b of the height aligning member 315 is formed approximately at a same height as a supporting surface 309c configured to support the sheets on the sheet supporting portion 309.

According to the first embodiment, the projected portion 314a is formed integrally with the lifter 314 through drawing, for example, but the drawing height and width are restricted by restriction conditions of the die, and there is little freedom. However, according to the present embodiment, the height aligning member 315 provided as a separate member as the lifter 314 complements the difference in height between the lifter 314 and the sheet supporting portion 309, such that the height aligning member 315 has high freedom of shape and material.

For example, if the width of the height aligning member 315 is increased to be greater than the projected portion 314a of the first embodiment, it becomes possible to more stably support the sheets supported on the sheet supporting portion 309, and prevent sagging of the lower surface of the sheets. Further, it becomes possible to prevent overloading of the sheets regardless of sheet size, by having the user refer to the loading limit line X of the loading limit mark 305a provided immediately above the height aligning member 315.

According to any of the embodiments described above, the height of the projected portion 314a and the height aligning member 315, and the height of the sheet supporting portion 309 in the standby position, are set approximately the same, but they can be diverged within a certain range as long as there is no influence by overloading of the sheets. In other words, the projected portion 314a and the height aligning member 315 should be provided such that the height difference between the lifter 314 and the sheet supporting portion 309 are reduced. Further, even though it is effective to have the projected portion 314a (or the height aligning member 315) and the loading limit mark 305a arranged one above the other at approximately the same position in the sheet conveyance direction, they can be arranged at different positions in the sheet conveyance direction as long as there is no influence by overloading of the sheets.

The above-described embodiments have been described with reference to the printer 200 of the electrophotographic system, but the present invention is not restricted thereto. For example, the present invention can be applied to an image forming apparatus adopting an inkjet system in which images are formed onto sheets by ejecting ink through nozzles.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-019017, filed Feb. 3, 2017, which is hereby incorporated by reference wherein in its entirety.

What is claimed is:

1. A sheet supporting apparatus comprising:
  a storage portion configured to store a sheet;
  a width regulating portion supported movably in a width direction orthogonal to a sheet conveyance direction on the storage portion, and configured to regulate a position of an end portion in the width direction of the sheet stored in the storage portion;
  a sheet supporting portion supported liftably between a standby position and a lifted position on the storage portion and configured to support the sheet, the sheet supporting portion comprising a supporting surface defining a non-interference region in which the width regulating portion can move in the width direction without interference with the sheet supporting portion;
  a lifting portion arranged below the sheet supporting portion, and configured to lift the sheet supporting portion toward the lifted position by pressing the sheet supporting portion from below; and
  a projected portion provided on the lifting portion, and configured to project upward toward the non-interference region,
  wherein the projected portion is formed as a separate member from the lifting portion, and arranged on an upper surface of the lifting portion.

2. The sheet supporting apparatus according to claim 1, wherein the non-interference region is a cutout formed on the supporting surface.

3. The sheet supporting apparatus according to claim 1, wherein the projected portion is set to approximately a same height as the supporting surface of the sheet supporting portion positioned at the standby position.

4. The sheet supporting apparatus according to claim 1, wherein the width regulating portion comprises an indication portion arranged directly above the projected portion, and configured to indicate an upper limit height of sheets supportable on the supporting surface of the sheet supporting portion.

5. The sheet supporting apparatus according to claim 1, wherein the width regulating portion comprises a contact surface configured to be in contact with an end portion of the sheet supported on the supporting surface, and
  the lifting portion and the projected portion respectively extend in the width direction, and are arranged to be overlapped with the contact surface when seeing from the sheet conveyance direction.

6. The sheet supporting apparatus according to claim 5, wherein the lifting portion is supported pivotably on the storage portion, and
  the contact surface defines a through hole configured to prevent the contact surface from interfering with a pivoting locus of the lifting portion.

7. An image forming apparatus comprising:
  a sheet supporting apparatus comprising:
  a storage portion configured to store a sheet;
  a width regulating portion supported movably in a width direction orthogonal to a sheet conveyance direction on the storage portion, and configured to regulate a position of an end portion in the width direction of the sheet stored in the storage portion;
  a sheet supporting portion supported liftably between a standby position and a lifted position on the storage portion and configured to support the sheet, the sheet supporting portion comprising a supporting surface defining a non-interference region in which the width regulating portion can move in the width direction without interference with the sheet supporting portion;
  a lifting portion arranged below the sheet supporting portion, and configured to lift the sheet supporting portion toward the lifted position by pressing the sheet supporting portion from below; and
  a projected portion provided on the lifting portion, and configured to project upward toward the non-interference region; and
  an image forming unit configured to form an image on the sheet fed from the sheet supporting apparatus,
  wherein the projected portion is formed as a separate member from the lifting portion, and arranged on an upper surface of the lifting portion.

8. The image forming apparatus according to claim 7, wherein the non-interference region is a cutout formed on the supporting surface.

9. The image forming apparatus according to claim 7, wherein the projected portion is set to approximately a same height as the supporting surface of the sheet supporting portion positioned at the standby position.

10. The image forming apparatus according to claim 7, wherein the width regulating portion comprises an indication portion arranged directly above the projected portion, and configured to indicate an upper limit height of sheets supportable on the supporting surface of the sheet supporting portion.

11. The image forming apparatus according to claim 7, wherein the width regulating portion comprises a contact surface configured to be in contact with the end portion of the sheet supported on the supporting surface, and
  the lifting portion and the projected portion respectively extend in the width direction, and are arranged to be overlapped with the contact surface when seeing from the sheet conveyance direction.

12. The image forming apparatus according to claim 11, wherein the lifting portion is supported pivotably on the storage portion, and
  the contact surface defines a through hole configured to prevent the contact surface from interfering with a pivoting locus of the lifting portion.

* * * * *